Figure 1:
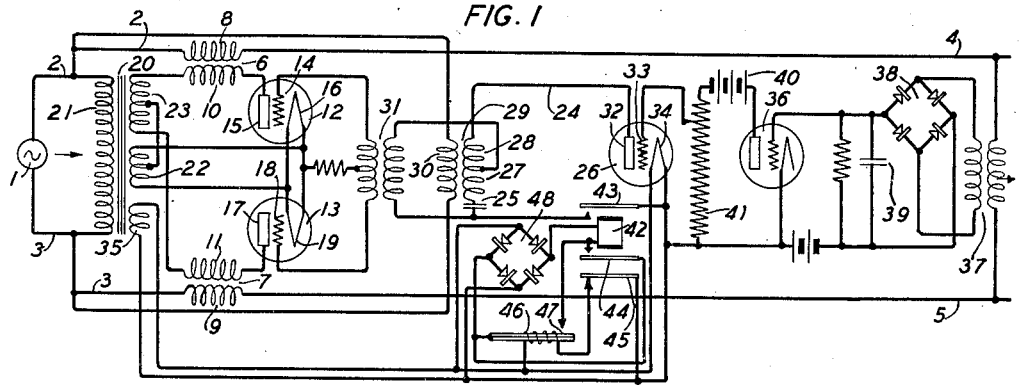

Sept. 13, 1938.     D. E. TRUCKSESS     2,129,890

REGULATOR

Filed March 20, 1937

INVENTOR
D. E. TRUCKSESS
BY Wayne B Wells
ATTORNEY

Patented Sept. 13, 1938

2,129,890

UNITED STATES PATENT OFFICE 2,129,890

REGULATOR

David E. Trucksess, Newark, N. J., assignor to Bell Telephone Laboratories, Incorporated, New York, N. Y., a corporation of New York Application March 20, 1937, Serial No. 132,026

11 Claims. (Cl. 175—363)

This invention relates to regulators and particularly to voltage regulators for maintaining the voltage on supply circuits substantially constant.

One object of the invention is to provide an alternating current supply circuit with a series transformer that shall be so controlled in an improved manner as to maintain the voltage constant on the supply circuit beyond the transformer.

Another object of the invention is to provide a regulator having an alternating current supply circuit connected to a direct current load circuit by means of a rectifier with a series transformer connected to the supply circuit ahead of said rectifier that shall control the transformer according to the voltage of the load circuit to maintain the load circuit voltage constant.

A further object of the invention is to provide a regulator having a series transformer and a two-element space discharge device connected between an alternating current supply circuit and a direct current load circuit that shall control the transformer to maintain the load circuit voltage constant by a phase detector tube having the phase between alternating potentials impressed on the plate and grid varied according to the load circuit voltage.

The voltage of an alternating current supply circuit in many cases varies beyond limits which can be tolerated either by a directly connected alternating current load circuit or by a direct current load circuit connected to the supply circuit by suitable rectifiers. In accordance with the invention the variations in the alternating current supply circuit voltage are controlled by means of series or booster transformers.

In a system constructed in accordance with the invention for supplying regulated rectified current from an alternating current supply circuit to a direct current load circuit the direct current load circuit is connected to the alternating current supply circuit by means of suitable recifiers. The recifiers may be of any suitable type, for example, copper oxide rectifiers or space discharge rectifiers. The invention has been illustrated by means of two-element space discharge rectifiers which may be of the gas-filled type if so desired. Booster transformers are positioned in the alternating current supply circuit ahead of the rectifiers with the secondary windings thereof connected in series with the supply circuit. The primary windings of the booster transformers have the current flow therethrough controlled by space discharge devices of the trigger type. These devices are gas-filled and have three electrodes. Alternating current from the supply circuit is impressed on the plate circuits and the grid circuits of the trigger devices. The plate circuits are connected to the primary windings of the booster transformers. When the trigger devices are conductive the primary windings of the booster transformers are effectively connected to the supply circuit so that the proper phase relations are established for boosting the voltage supplied to the load circuit through the rectifiers.

The boosting action effected by the transformers on the supply circuit is controlled by varying the phase relation of the potentials impressed on the grids of the trigger devices with respect to the potentials impressed on the plates of the trigger devices. The phase relation between the potentials impressed on the plates and grids of the trigger devices is controlled by a phase shifting bridge in accordance with the voltage on the load circuit. One arm of the phase shifting bridge comprises a three-element space discharge device which is controlled through an amplifier by the voltage on the direct current load circuit.

Figure 2:
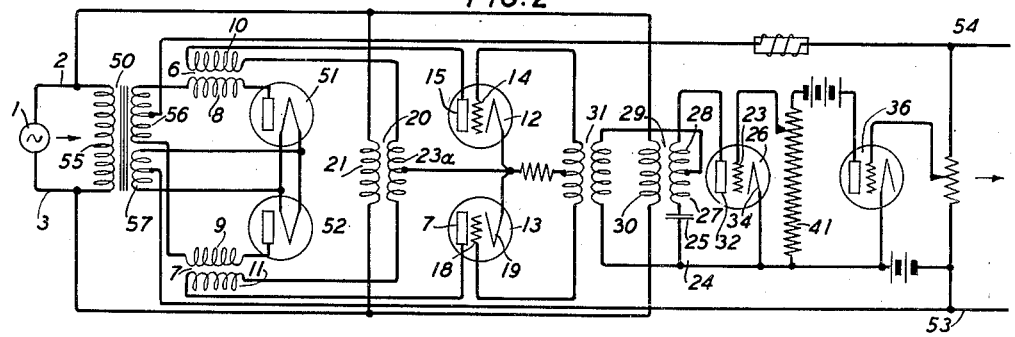
Figure 3:
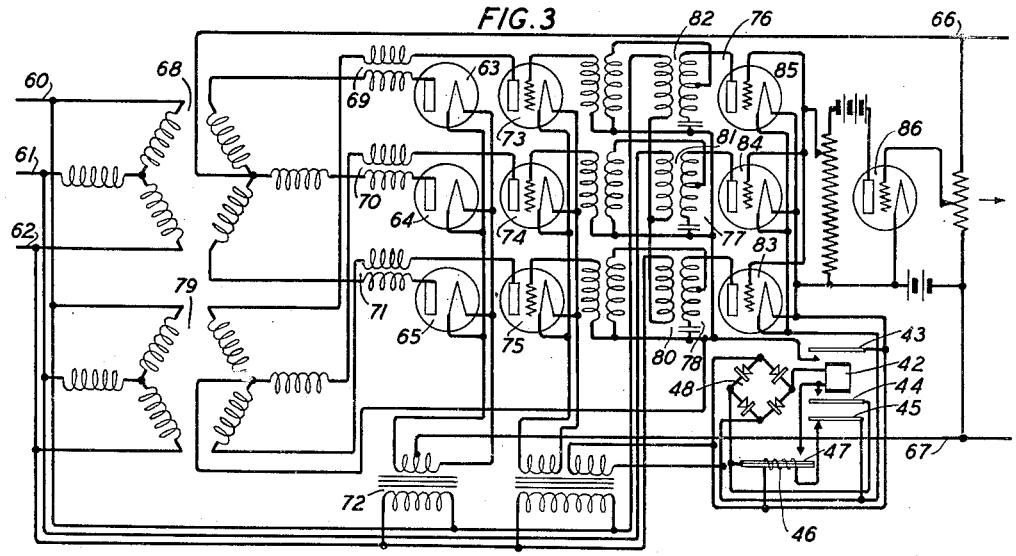

In the accompanying drawing:

Fig. 1 is a diagrammatic view of an alternating current circuit having the voltage thereof maintained constant in accordance with the invention;

Fig. 2 is a diagrammatic view of a direct current load circuit connected by two-element space discharge rectifiers to an alternating current supply circuit with the load circuit voltage maintained constant in accordance with the invention; and Fig. 3 is a modification of the circuit shown in Fig. 2 and discloses a direct current load circuit supplied with regulated rectified current from a three-phase supply circuit.

Referring to Fig. 1 of the drawing a source of alternating current 1 is shown connected by conductors 2 and 3 to an alternating current load circuit comprising conductors 4 and 5. The voltage on the load circuit is controlled by means of two series or booster transformers 6 and 7. The secondary windings 8 and 9 of the transformers 6 and 7 are connected in series with the conductors 2 and 3 of the supply circuit. The primary windings 10 and 11 of the booster transformers 6 and 7 are connected in the plate circuits of two so-called trigger devices 12 and 13.

The space discharge devices 12 and 13 are of the three-element type and are filled with a vapor or gas so that they have a trigger action. The device 12 comprises a grid 14, a plate 15 and a cathode 16. The device 13 comprises plate 17, grid 18 and cathode 19. A transformer 20 is provided for supplying power to operate the devices 12 and 13. The primary winding 21 of the transformer 20 is connected to the supply conductors 2 and 3. One secondary winding 22 of the transformer 20 is connected to the cathodes 16 and 19 for supplying heating current. Another secondary winding 23 of the transformer 20 is divided so that sections thereof are connected in series with the primary windings 10 and 11 of the booster transformers 6 and 7 in the plate circuits of the trigger devices 12 and 13.

Alternating potentials are impressed on the grids 18 and 14 of the devices 13 and 12 under control of a phase shifting bridge circuit 24. The phase shifting bridge circuit 24 has one arm in the form of a condenser 25, another arm in the form of a space discharge device 26 and two arms 27 and 28 in the form of a secondary winding of a transformer 29. The primary winding 30 of the transformer 29 is connected across the supply conductors 2 and 3. The output vertices of the bridge 24 are connected by a transformer 31 to the grid circuits of the devices 12 and 13. The space discharge device 26 which forms one arm of the bridge circuit 24 comprises a plate 32, a grid 33 and a cathode 34. The cathode 34 is supplied with heating current from a secondary winding 35 of the transformer 20.

The phase of the potentials impressed on the grids 14 and 18 of the trigger devices 12 and 13 with respect to the potentials impressed on the plates 15 and 17 thereof is controlled according to the voltage impressed on the grid 33 of the device 26. The difference in the phase of the potentials impressed on the grids 14 and 18 with respect to the potentials impressed on the plates 15 and 17 determines the amount of boost effected by the transformers 6 and 7 on the supply circuit voltage. When the devices 12 and 13 are made conductive the primary windings 10 and 11 are effectively connected through the secondary windings 8 and 9 to the supply circuit with the proper phase relations established. The secondary voltages produced in the windings 8 and 9 are in phase with the supply voltage and add in phase over each cycle to the supply circuit voltage. The amount of boost effected by the transformers 6 and 7 is determined according to the point in the cycle at which the devices 12 and 13 discharge or are triggered off. The point of discharge of the devices 12 and 13 is determined according to the phase of the potentials on the grids 14 and 18 with respect to the potentials on the plates 15 and 17.

The boost provided by the transformers 6 and 7 is supplied only during a fraction of each current cycle. When the triggering off of the devices 12 and 13 is delayed by approximately 180 degrees the boost provided by the transformers 6 and 7 is negligible and a voltage drop will occur over the transformers 6 and 7 due to their impedances which will cause a reduction in the supply circuit voltage. In this way the voltage supplied to the load conductors 4 and 5 can be varied over a range extending from less than the voltage impressed on the conductors 2 and 3, to greater than the voltages on the conductors 2 and 3, the magnitude of the variation depending on the ratios of the transformers 6, 7 and 20 and the discharge point of the devices 12 and 13.

The voltage impressed on the grid 33 of the device 26 is controlled by a direct current amplifier 36 according to the voltage across the load conductors 4 and 5. A transformer 37 is connected to a rectifier 38 which in turn is connected to the input circuit of the amplifier 36. A condenser 39 is provided across the rectifier 38 for filtering purposes. Plate potential is supplied from the battery 40 to the amplifier 36. The grid circuit for the device 26 is connected across resistor 41 in the plate circuit of the amplifier 36.

A relay 42 is provided for preventing closing and operation of the bridge 24 until after the filaments 16 and 19 of the devices 12 and 13 have been heated for a predetermined length of time. The relay 42 is provided with switch members 43, 44 and 45. A thermal relay 46 having a switch member 47 is provided for controlling the operation of the relay 42. The relays 42 and 46 are operated by current supplied from the secondary winding 35 of the transformer 20. Upon energization of the transformer 20 from the supply conductors 2 and 3 heating current is supplied to the winding of the thermal relay 46 from the secondary winding 35. The energizing circuit for the relay 46 is completed through the switch member 45 of the relay 42. When the relay 46 is heated to a predetermined point which takes a predetermined length of time the switch member 47 completes a circuit from a full wave rectifier 48 through a winding of the relay 42. The rectifier 48 is connected to the secondary winding 35. Upon operation of the relay 42 the switch member 43 completes the circuit of the bridge 24 and the switch member 44 completes a locking circuit for the relay 42. The delay in the operation of the relay 42 is sufficient to insure the heating of the cathodes 16 and 19 of the devices 12 and 13 before any operation of the devices 12 and 13 can take place.

If the voltage on the load conductors 4 and 5 is raised above normal value the potential impressed on the grid 33 of the device 26 is raised to change the phase relation of the potentials impressed on the grids 14 and 18 a greater amount with respect to the potentials impressed on the plates 15 and 17. In this manner the discharge point of devices 12 and 13 is delayed and the boosting action of the transformers 6 and 7 is lowered to lower the voltage on the supply conductors 4 and 5. If the voltage on the supply conductors 4 and 5 falls below normal value the potential impressed on the grid 33 is lowered to change the phase relation of the potentials on the grids with respect to the potentials on the plates of the devices 12 and 13 so that the devices 12 and 13 trigger off at an earlier period in each cycle. The boosting action of the transformers 6 and 7 is thus raised to increase the voltage on the conductors 4 and 5.

Referring to Fig. 2 of the drawing a system very similar to the system shown in Fig. 1 is provided for supplying voltage to a direct current load circuit. Like parts in the system shown in Fig. 2 to those shown in Fig. 1 will be indicated by similar reference characters. The alternating current supply conductors 2 and 3 are connected by a transformer 50 to two-element space discharge devices 51 and 52 which in turn are connected to a direct current load circuit comprising conductors 53 and 54. The transformer 50 comprises a primary winding 55, a divided secondary winding 56 connected to the plates of the devices 51 and 52 and a secondary winding 57 supplying heating current to the cathodes of the devices 51 and 52. The secondary windings 8 and 9 of the booster transformers 6 and 7 are connected to the alternating current circuit between the secondary winding 56 of the transformer 59 and the plates of the devices 51 and 52. The primary windings 10 and 11 of the booster transformers 6 and 7 are controlled by the two space discharge devices 12 and 13 in the same manner as the control of the primary windings of the two booster transformers 6 and 7 is effected in the system shown in Fig. 1 of the drawing. The transformer 20 in Fig. 2 of the drawing is provided with a primary winding 21 and a divided secondary winding 23 having the parts thereof connected to the primary windings 10 and 11 of the booster transformers 6 and 7 in the same manner as disclosed in Fig. 1 of the drawing.

The devices 12 and 13 are controlled by a bridge 24 similar in construction and operation to the bridge shown in Fig. 1 of the drawing. The transformer 29 which is connected to the bridge 24 has the primary winding 30 thereof connected to the supply conductors 2 and 3. The direct current amplifier 36 in Fig. 2 of the drawing has the input circuit directly connected to the load conductors 53 and 54 inasmuch as the conductors 53 and 54 carry direct current. The relays 46 and 42 and the circuits controlled thereby for preventing operation of the bridge 24 until the filaments of the devices 12 and 13 have been heated are omitted from the circuits shown in Fig. 2 of the drawing for simplicity in illustration.

Referring to Fig. 3 of the drawing a three-phase supply circuit comprising conductors 60, 61 and 62 is connected by rectifiers 63, 64 and 65 to a direct current load circuit comprising conductors 66 and 67. The voltage on the supply conductors 60, 61 and 62 connected to the rectifiers 63, 64 and 65 is controlled by booster transformers 69, 70 and 71. The transformers 69, 70 and 71 are similar in construction and operation to the transformers 6 and 7 shown in Figs. 1 and 2 of the drawing. A transformer 72 which is connected across the supply conductors 62 and 60 supplies heating current to the cathodes of the devices 63, 64 and 65. The primary windings of the booster transformers 69, 70 and 71 are respectively controlled by the trigger space discharge devices 73, 74 and 75. The trigger devices 73, 74 and 75 are similar in construction and operation to the devices 12 and 13 shown in Figs. 1 and 2 of the drawing. The devices 73, 74 and 75 are respectively controlled by bridge circuits 76, 77 and 78. The bridge circuits 76, 77 and 78 are similar in construction and operation to the bridge circuit 24 shown in Figs. 1 and 2 of the drawing. Alternating plate potential for the devices 73, 74 and 75 is supplied by a three-phase transformer 79 having the primary winding thereof connected to the supply conductors 60, 61 and 62. Transformers 80, 81 and 82, each of which correspond to the transformer 29 shown in Figs. 1 and 2 of the drawing, are respectively connected to the same phases of the secondary winding of the transformer 79 as the corresponding devices 75, 74 and 73. The three-element space discharge devices 83, 84, 85 which respectively form one arm of the bridge circuits 78, 77 and 76 are controlled by a direct current amplifier 86 which is similar in construction and operation to the direct current amplifiers 36 shown in Figs. 1 and 2 of the drawing.

A thermal relay and a bridge control relay are provided in the system of Fig. 3 which is similar in construction and operation to the relays 46 and 42 shown in Figs. 1 and 2 of the drawing. A detailed description of the operation of these relays with respect to Fig. 3 of the drawing is deemed unnecessary. Like parts have been indicated by similar reference characters. The system shown in Fig. 3 of the drawing operates in exactly the same manner as the system shown in Fig. 2 of the drawing and a detailed explanation thereof is deemed unnecessary.

Modification in the circuit and in the arrangement and location of parts may be made within the spirit and scope of the invention and such modifications are intended to be covered by the appended claims.

What is claimed is:

1. In combination, an alternating current supply circuit, a series transformer having the secondary winding thereof connected to said circuit, a load circuit connected to the secondary winding of said series transformer, a three-element space discharge device for controlling the current flow through the primary winding of said transformer, and means for impressing alternating potential from said supply circuit on the plate and grid circuits of said device and for varying the phase relation of the potentials impressed on the grid and plate to maintain the voltage on the load circuit beyond said transformer substantially constant.

2. In combination, an alternating current supply circuit, a load circuit, a booster transformer connected to the load circuit for controlling the potential of said load circuit, means comprising a three-element space discharge device for controlling said transformer, means for impressing alternating current from said supply circuit on the anode and grid circuits of said device, and means operated according to the potential on the load circuit beyond said transformer for varying the phase relation of the potential impressed on the grid of said device with respect to the potential impressed on the anode to control said booster transformer.

3. In combination, a main alternating current circuit, a booster transformer connected to each side of said circuit, three-element space discharge devices for controlling said transformers to govern the voltage on the circuit beyond said transformers, means for impressing alternating current from said main circuit on the grid and plate circuits of said devices, and means for varying the phase relation between the potentials on the plate and grid circuits of each device according to the voltage on the main circuit beyond said transformers to control said booster transformers and maintain the voltage constant on said circuit beyond the transformers.

4. In combination, an alternating current supply circuit, a load circuit, a booster transformer connected to said load circuit, a three-element gas-filled space discharge device for controlling said transformer, means for impressing alternating potential from said supply circuit on the plate and grid circuits of said device, means comprising a phase shifting bridge having one arm thereof in the form of a control three-element space discharge device for controlling the phase of the potential impressed on the grid of said first-mentioned device with respect to the potential impressed on the plate thereof, and means for obtaining potential from the load circuit beyond said transformer to control the grid of the control device and maintain the load circuit voltage beyond said transformer constant.

5. In combination, a main alternating current circuit, a booster transformer connected to said circuit, a three-element space discharge device for controlling said transformer, means for impressing alternating current from the main circuit on the plate and grid circuits of said device, means comprising a phase shifting bridge having one arm thereof in the form of a control three-element space discharge device for controlling the phase of the potential impressed on the grid of said first-mentioned device with respect to the potential impressed on the plate thereof, means for preventing closing of said bridge until a definite time interval after said main circuit has been energized, and means for rectifying potentiial from said main circuit beyond said transformer to control the grid of the control device and maintain the main circuit voltage beyond said transformer constant.

6. In combination, a rectifier device connected between an alternating current supply circuit and a direct current load circuit, a booster transformer having the secondary winding thereof connected in the circuit of said device, means for impressing potential on the primary winding of said transformer under control of a three-element space discharge device, means for impressing alternating potentials on the plate and the grid circuits of said three-element device and for varying the phase of the grid potential with respect to the plate potential according to the load circuit voltage to maintain the load circuit voltage constant.

7. In combination, an alternating current supply circuit, a direct current load circuit, rectifying means connected between said circuits, a series transformer connected in circuit with said rectifying means, means for impressing boosting voltage from the alternating current supply circuit on said transformer in series with a three-element space discharge device, and means for impressing potential on the grid of said three-element device from said alternating current circuit which varies in phase with respect to the potential impressed on the plate thereof according to the potential on said load circuit to maintain the load circuit voltage constant.

8. In combination, a diode space discharge device connected between an alternating current supply circuit and a direct current load circuit, a booster transformer connected to said supply circuit ahead of said device, means comprising a three-element space discharge device for controlling said transformer, means for impressing alternating potential from said supply circuit on the plate and grid circuits of said three-element device, means comprising a phase shifting bridge circuit having one arm in the form of a control three-element space discharge device for controlling the phase of the potential impressed on the grid of the first-mentioned three-element device with respect to the potential impressed on the plate thereof, and means for impressing potential on the grid of the control device according to the voltage of the load circuit to maintain the load circuit voltage constant.

9. In combination, a diode space discharge device connected between an alternating current supply circuit and a direct current load circuit, a booster transformer connected to said supply circuit ahead of said device, a three-element space discharge device for controlling said transformer, means for impressing alternating potential from said supply circuit on the plate circuit of said three-element device, a phase shift transformer having the primary winding thereof connected to said supply circuit, a phase shifting bridge circuit comprising two arms formed by the secondary winding of said phase shift transformer, a capacity arm, and an arm formed by a three-element space discharge device, said bridge supplying an alternating potential to the grid of the first-mentioned three-element device, and means for impressing potential on the grid of the device in said bridge to control the phase of the potential on the grid of the first-mentioned device and maintain the load circuit voltage constant.

10. In combination, rectifier devices connected between a three-phase supply circuit and a direct current load circuit, booster transformers connected between said devices and the supply circuit, means comprising a three-element space discharge device for controlling each of said transformers, means for impressing alternating potentials from said supply circuit on the plate and grid circuit of each of said three-element devices corresponding in phase to the connection of the associated transformer to the supply circuit, and means for varying the phase of the potential on each grid with respect to the potential on the associated plate according to the voltage of the load circuit.

11. In combination, two-element space discharge devices connected between a three-phase supply circuit and a direct current load circuit, booster transformers connected between said devices and the supply circuit, means comprising a three-element space discharge device for controlling each of said transformers, means for impressing alternating potentials from said supply circuit on the plate and grid circuits of each of said three-element devices corresponding in phase to the connection of the associated transformer to the supply circuit, and means comprising a phase shift bridge associated with each of said three-element devices for varying the phase of the potential on the grid of the associated device with respect to the potential on the plate according to the load circuit voltage.

DAVID E. TRUCKSESS.